Dec. 15, 1964 E. G. BROWN 3,161,811
SEMICONDUCTOR DEVICE MOUNT
Filed Feb. 15, 1960
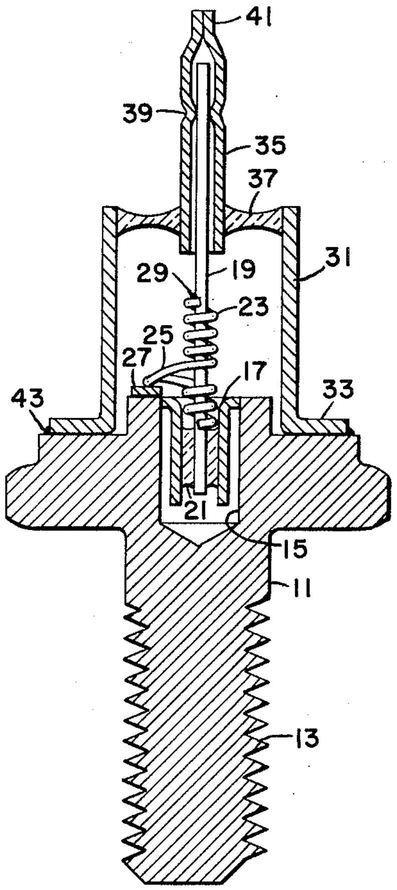
INVENTOR
ELMER G. BROWN
Flehr & Swain
ATTORNEYS United States Patent Office 3,161,811
Patented Dec. 15, 1964

3,161,811
SEMICONDUCTOR DEVICE MOUNT

Elmer G. Brown, Mountain View, Calif., assignor, by mesne assignments, to Clevite Corporation, Cleveland, Ohio, a corporation of Ohio Filed Feb. 15, 1960, Ser. No. 8,619
2 Claims. (Cl. 317—234)

This invention relates generally to mounts for semiconductor devices and more particularly to mounts employing a spring type contact.

Mounting semiconductor device structures in capsules and the like is a time consuming and delicate operation. In coaxial mounts, the devices are generally soldered to a base or header. A coaxial lead is then extended downwardly through a cap or cover to make a spring contact with the upper surface of the device. Solder may be applied to assure that a good ohmic contact is formed. Labor costs are high and mounts of the foregoing type cannot withstand large forces of acceleration.

It is, therefore, a general object of this invention to provide an improved semiconductor device mount.

It is another object of this invention to provide a semiconductor mount employing a relatively rigid lead-in conductor having a spring contact associated therewith for providing electrical connection between the conductor and an associated semiconductor device.

It is still another object of the present invention to provide a semiconductor device mount which employs a relatively rigid coaxial lead-in conductor which receives a coil spring including a contacting arm, said elements being so arranged that the contacting arm exerts a predetermined pressure on a device with which it contacts.

These and other objects of the invention will become more clearly apparent upon a reading of the following description in conjunction with the accompanying drawing, which is an elevational view partly in cross section of one embodiment of the invention.

A header 11 which may be formed of copper or some other suitable material is shown. The lower end of the header 11 may be threaded as at 13 for chassis mounting. A recess 15 is provided in the upper surface of the header. A metal insert 17 is placed in the recess and held therein by some convenient means, such as a force fit. A lead 19 is held by the sleeve 17 and is maintained in spaced insulated relationship from the sleeve 17 and the header 11 by a glass bead 21. The sleeve 17 and the lead 19 may, but not necessarily, be of a material having substantially the same general coefficient of expansion as the glass. Kovar is one such material.

A coil spring 23 is disposed about the lead 19. Its lowermost turn is seated on the glass bead 21. A convolution 25 of the spring 23 extends radially outwardly to form a contact finger or arm. In plan, the finger is substantially U-shaped. The end of the finger is bent downwardly. A semiconductor wafer is mounted in the capsule by placing it with one surface in intimate contact with the header. The finger is then placed on the other surface. The header serves as a heat sync for the element. The spring may be formed of .010 inch diameter .2% Berylin Copper, having the relaxed internal diameter of its convolutions slightly less than the diameter of the lead 19. The spring 23 may be held in position on the lead 19 by the friction, or alternatively the spring may be retained by welding as at 29.

A cover 31 including a radial sealing flange 33 is placed on the header 11 and disposed about the semiconductive material 27 and the spring 23. The upper portion of the header included a deformable tube 35 attached to the walls of the cover 31 by means of glass beading 37. Deformable tube 35 serves to receive the lead wire 19, and upon deformation such as by crimping at 39, a good electrical contact with the lead is established. The top of the tube 35 is crimped and welded to form a vacuum seal as at 41. A weld 43 is formed between the cover so as to provide a vacuum compartment wherein the semiconductor material is included.

The assembly of the aforementioned mount is as follows: The lead 19 is inserted into the sleeve 17 with a glass bead formed therebetween. The glass bead is made to extend only partially along the longitudinal distance of the sleeve thereby to provide a free end at the upper portion of the sleeve. The thus completed lead assembly is then inserted by force or other means into the opening of the header 11. Alternatively, the lead 19 may be placed within opening 15 in any manner which electrically insulates it from the header 11.

A piece of shim material is located on the header at a point whereby the semiconductive material will eventually be deposited. The spring 23 is then inserted about the lead 19 and is bottomed on the glass bead 21. The finger 25 is placed on the previously located shim so as to prevent any possible deformation on the surface of the copper header 11. Suitable pressure is then applied on top of the spring 23 and a weld 29 is formed thereon. At this time, the finger 25 may be lifted, the shim removed and the semiconductor element 27 placed under the finger 25. Due to the resilient nature of the spring 23, the pressure on the semiconductor element will not be excessive and breakage will not result.

The cover 31 having an open ended tube 35 formed therein is placed over the lead 19 onto the header 11 and is welded thereto at 43. The enclosed area is then evacuated and sealed at 41, after which the tube 35 may be crimped at 39 to form electrical contact with the lead 19.

Thus, it is seen that a new semiconductor device mount has been provided wherein the pressure on the semiconductive element itself may be easily predetermined.

I claim:

1. A mount for semiconductor devices comprising a header having a semiconductive element thereon, said header having an indentation therein, an electric insulator within said indentation, a lead disposed in said indentation and mounted on said insulator, a spring having a coiled portion and a radial extension from said coiled portion, said extension being intermediate the ends of the coiled portion, said coiled portion being disposed about said lead and having one end seated on said insulation, and said extension being in resilient contact with said element.

2. A mount as defined in claim 4 wherein the other end of said coiled portion is welded to said lead.

References Cited in the file of this patent

UNITED STATES PATENTS

| | | |
|---|---|---|
| 1,104,065 | Miessner | July 21, 1914 |
| 1,449,148 | Gehrig | Mar. 20, 1923 |
| 1,702,836 | Mann | Feb. 19, 1929 |

FOREIGN PATENTS

| | | |
|---|---|---|
| 38,408 | Denmark | Feb. 6, 1928 |

UNITED STATES PATENT OFFICE

CERTIFICATE OF CORRECTION

Patent No. 3,161,811 December 15, 1964

Elmer G. Brown

It is hereby certified that error appears in the above numbered patent requiring correction and that the said Letters Patent should read as corrected below.

Column 2, line 55, for the claim reference numeral "4" read -- 1 --.

Signed and sealed this 27th day of July 1965.

(SEAL)
Attest:

ERNEST W. SWIDER
Attesting Officer

EDWARD J. BRENNER
Commissioner of Patents